United States Patent
Ortiz et al.

(10) Patent No.: US 9,766,080 B1
(45) Date of Patent: Sep. 19, 2017

(54) SYSTEMS AND METHODS FOR INDOOR AND OUTDOOR MOBILE DEVICE NAVIGATION

(71) Applicant: Phunware, Inc., Austin, TX (US)

(72) Inventors: C. Enrique Ortiz, Round Rock, TX (US); Illya Busigin, Leander, TX (US)

(73) Assignee: Phunware, Inc., Austin, TX (US)

( * ) Notice: Subject to any disclaimer, the term of this patent is extended or adjusted under 35 U.S.C. 154(b) by 20 days.

(21) Appl. No.: 15/061,933

(22) Filed: Mar. 4, 2016

Related U.S. Application Data (60) Provisional application No. 62/129,665, filed on Mar. 6, 2015.

(51) Int. Cl.
  G01C 21/00 (2006.01)
  G01C 21/20 (2006.01)
  H04W 4/02 (2009.01)
(52) U.S. Cl.
  CPC .......... G01C 21/206 (2013.01); G01C 21/00 (2013.01); H04W 4/021 (2013.01); H04W 4/025 (2013.01); H04W 4/027 (2013.01); H04W 4/028 (2013.01)

(58) Field of Classification Search
  CPC ..... G01C 21/206; G01C 21/00; H04W 4/021; H04W 4/025
  See application file for complete search history.

(56) References Cited

U.S. PATENT DOCUMENTS 9,392,941 B2 *  7/2016  Powch ............... A61B 5/02055
2012/0237088 A1 *  9/2012  Bekaert ................. G06T 17/05
                                                                 382/113

* cited by examiner

*Primary Examiner* — Adam Alharbi
(74) *Attorney, Agent, or Firm* — Wilson Sonsini Goodrich & Rosati (57) ABSTRACT

The present disclosure provides methods and systems for facilitating indoor and outdoor navigation on a mobile device. First position information may be received from a first location provider and second position information may be received from a second location provider. Additionally, first normalized position information based at least in part on the first position information and second position information may be obtained. Based at least on the first normalized position information, a determination may be made that a mobile device is transitioning from a first geographic region to a second geographic region. Additionally, a determination may be made that the mobile device has entered a zone associated with the second geographic region. Further, a map of the second geographic region may be displayed on a user interface of the mobile device.

20 Claims, 4 Drawing Sheets

SYSTEMS AND METHODS FOR INDOOR AND OUTDOOR MOBILE DEVICE NAVIGATION

CROSS-REFERENCE TO RELATED APPLICATIONS

This application claims the benefit of U.S. Provisional Patent Application Ser. No. 62/129,665 entitled "Systems and Methods for Indoor and Outdoor Mobile Device Navigation," filed Mar. 6, 2015, the disclosure of which is hereby incorporated by reference in its entirety.

BACKGROUND

The ubiquity of mobile electronic devices and mobile applications allows people to access a wide variety of digital data and online services such as shopping, gaming, and navigation. Location detection is useful in mobile applications that require knowledge of a user's position or whether a user is entering or exiting a particular geographic area. For example, in location-based marketing, it is desirable for merchants to know when the user of a mobile device is in or near a retail store. In such a case, the merchant may wish, for example, to send the user a message with a coupon inviting them to come into the store. As another example, mapping and navigation applications frequently utilize real-time estimations of the mobile device's position. Accordingly, accurate and precise location detection is important for many aspects of mobile device operation.

Several methodologies have been developed to determine the position of a mobile communications device. For example, the position of a device may be determined based on triangulation of nearby cell towers and based on properties of the connection the device has with each of these towers. However, such methods may yield inaccurate results under certain circumstances such as, for example, when there is insufficient cell tower density to provide precise resolution (e.g., meter-level resolution) of the device's position. Wi-Fi triangulation may also be utilized to determine the position of a mobile communications device. This approach is analogous to cell tower triangulation, but uses Wi-Fi hot spots near the device to determine its position. However, the applicability of this technique may be limited when, for example, the set of known Wi-Fi hot spots in a region is not sufficiently large, or when the user does not have access to the Wi-Fi network because the Wi-Fi radio is off, or when the user has not authenticated with the Wi-Fi network. The Global Positioning System (GPS) may also be used to determine the position of a mobile communications device. GPS involves a constellation of satellites that broadcast data, allowing the device to determine its location using a triangulation calculation. However, GPS methodologies may have certain drawbacks. For example, GPS signals may not be sufficiently strong, or may have multipath issues, in certain locations. Furthermore, receiving and processing GPS position updates on an ongoing basis is typically battery intensive for mobile communications devices. Accordingly, mobile devices may process position data from different types of location providers.

SUMMARY

The present disclosure provides methods and systems for performing location-based computer processing based on position data from multiple location providers. In one embodiment, first position information is received from a first location provider, the first position information having a first data model. Second position information having a second data model is received from a second location provider. Based at least on the first and second position information, first normalized position information is obtained, and a determination is made that the mobile device is transitioning from a first geographic region associated with first map data to a second geographic region associated with second map data. A second determination is also made that the mobile device has entered a zone associated with the second geographic region based on the first normalized position information and based on information related to a boundary of a Geo-fence that is associated with the second region. These determinations cause one or more computer programs executing on the mobile device to display a map of the second geographic region on a user interface of the mobile device or switch into the proper map context such as indoor versus outdoor mapping and navigation given the obtained position information. In some cases, the determinations may be used to switch a display from a first geographic region to a second geographic region, or may be used to display a proper map context such as indoor region vs. outdoor region. Additionally or alternatively, navigation information may be provided based on the obtained normalized position information.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Fig." and "FIGs." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides methods and systems for detecting and handling mobile device transitions between regions. In some embodiments, position information from multiple location providers is converted to a normalized data model to offer a provider-independent abstraction for estimating the mobile device's position. Such providers may be indoor or outdoor location providers. Normalized position information from multiple location providers may be combined to estimate the device's current position, or one or more location providers may be prioritized or selected as active location providers. An additional mechanism may also be used to provide multi-factor validation for transitions between regions. For example, approaching or crossing a Geo-fence or other zone boundary may also be used to determine that the device is transitioning between regions. In particular, the zone information, including boundaries, of a Geo-fence may be based on a definition and/or configuration received from a server. Additionally, the location of the mobile device may be based on position information of the mobile device as received from one or more providers. In some cases, the provider information may be normalized as discussed above. Accordingly, the determination that a Geo-fence has been approached or crossed may be performed locally on the mobile device based on information received from the server and the one or more location providers, such as zone information and normalized position information. The normalized position information and the zone information may then be used to trigger an event in one or more programs executing on the mobile device. For example, a transition between outdoor and indoor mapping may be triggered when a determination is made that the device is moving into the indoor location.

Normalizing location provider data from outdoor and indoor providers and using multiple mechanisms to detect or validate zone transitions may provide more accurate and efficient transitions between outdoor and indoor mapping. For example, transitioning between an outdoor region and an indoor region may be improved by using multiples types of position information to determine when the transition is occurring. Furthermore, normalization may provide seamless transitions between indoors and outdoors. For example, the normalized data model is provider-independent, which may simplify location-based processing for applications that use position information (such as, for example, mapping applications) since the position abstraction may be the same regardless of the underlying location provider. Furthermore, using the same (or similar) normalized data model whether the device is indoors or outdoors may provide seamless transitions between indoor and outdoor since the data model for the device's position remains the same (or similar) before and after the transition. In particular, the normalized data model may simplify application logic by reducing application complexity related to managing many disparate location providers and related data models. The normalized data model may also facilitate more accurate and precise determination of the device's position since position information from disparate location providers may be more readily combined or compared.

As used herein, determination of a mobile device's position includes affirmative determinations as well as estimations that may have varying degrees of certainty. Furthermore, the estimated position may include any type of information that indicates the device's position or trajectory. The estimated position may include an estimate of the position alone, or it may include other information indicating a trajectory. As used herein, trajectory information encompasses any information that indicates the device's trajectory including, but not limited to, heading, speed, estimated path, or any other information indicative of the device's future position. Furthermore, as used herein, regions may refer to one, two, or three-dimensional regions. For example, a region may include a two dimensional area, a particular floor or other vertical space within that area, a line, a boundary, a point, or any other spatial region.

As user herein, a "zone" generally refers to a virtual representation of a region, such as, for example, a geo-fence. Zones may be static or dynamic, and they may be identified or represented in any suitable manner.

As used herein, "transitioning" between zones or crossing a zone generally encompasses actually entering, exiting, or other contacting a zone as well as approaching a zone. The threshold for determining what constitutes such an approach can be made using any suitable method.

Figure 1:
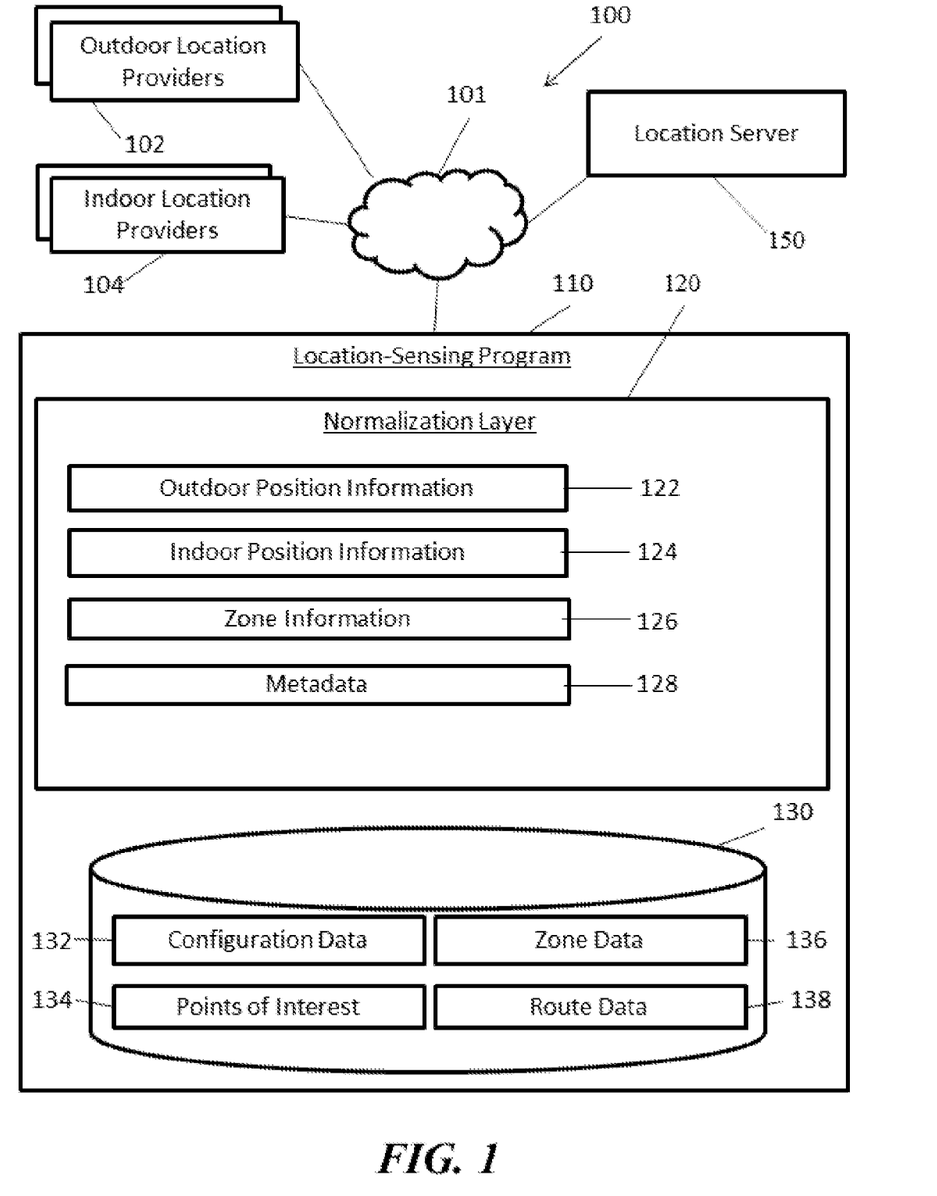
FIG. 1 illustrates example components of a location-sensing system that may be used in some embodiments of the present disclosure.

FIG. 1 illustrates example components of a location-sensing system that may be used in some embodiments of the present disclosure. System 100 includes network 101, outdoor location providers 102, indoor location providers 104, location-sensing program 110, and location server 150.

Network 101 represents one or more computer networks or other types of communications network that facilitate communication between the components of system 100. Though illustrated as a single network, network 101 may include any number of separate networks that are interconnected directly or indirectly. Network 101 may have any structure, configuration, or function described below with respect to network 401.

Outdoor location providers 102 include any system, service, device, network, or other component that provides position information to location-sensing program 110. Some embodiments include one or more outdoor location providers 102. Identification of certain location providers as "outdoor" location providers is for convenience purposes only, and such providers may include systems or components that are not physically located outside, and such providers may estimate the mobile device's position regardless of whether the mobile device is actually located outside. Furthermore, outdoor location providers 102 are illustrated as remote from location-sensing program 110 for convenience purposes only, and such providers may be remote from the device running location-sensing program 110 or local to such device. For example, outdoor location providers 102 may be "network-based" (where in the position is estimated based on one or more signals provided by one or more components of a network) or "device-based" (where the mobile device estimates its position based on its own sensor-readings). Some outdoor location providers may also be a hybrid of these approaches (e.g., a provider may base its position estimate on signals measured by both the device and one or more network elements). In some embodiments, signals may be received at one location and then communicated to and processed by a device at another location.

Outdoor location providers may use any suitable system including, but not limited to, the Global Positioning System ("GPS"), the Global Navigation Satellite System ("GLONASS"), Galileo Global navigation satellite system (GNSS), or cell tower triangulation, though such technologies are not required. Certain embodiments may utilize any suitable technology to facilitate the determination of the device's position. Furthermore, outdoor location providers 102 may express the position using any suitable data model with any suitable format and information, and different providers may provide different types of information or use different formats. In some embodiments, this position information is communicated to location-sensing program 110 and processed as discussed further below.

Indoor location providers 104 include any system, service, device, network, or other component that provides position information to location-sensing program 110. Some embodiments include one or more indoor location providers 104. Indoor location providers 104 may utilize any location-providing technology or methodology discussed above with respect to outdoor location providers 102. Other examples of location-providing technology that can be used by indoor location providers 104 include, but are not limited to, Bluetooth®, Bluetooth® Low Energy ("BLE"), Wi-Fi, near-field communication ("NFC"), and ZigBee®. Indoor location providers 104 may be associated with one or more specific venues or zones and may utilize one or more location-sensing systems that are specific to such venues or zones. One or more portions of the position information calculated by indoor location providers 104 may be similar to the type of position information provided by outdoor location providers 102. For example, indoor location providers may estimate latitude and longitude or provide other types of information that is globally relevant. In addition to or in place of such information, indoor information providers 104 may provide information specific to the particular venue or region with which they are associated. For example, an indoor location provider 104 associated with a grocery store may determine that the mobile device is located on a particular aisle of the store. Such information may be used to trigger one or more events on the mobile device that are related to the venue or the particular portion of the venue.

Identification of certain location providers as "indoor" location providers is for convenience purposes only, and such providers may include systems or components that are not physically located inside, and associated venues may include one or more areas that are not inside. For example, a park, theater, golf course, or other venue may include one or more areas that are not contained within buildings but that still provide zone-specific location-sensing systems and may still be considered an "indoor" location provider as used herein. Furthermore, some technologies may facilitate both outdoor and indoor location detection. For example, an outdoor location provider 102 may utilize the mobile device's detection of nearby Wi-Fi hotspots in conjunction with a database of known Wi-Fi hotspots to determine the device's position. An indoor location provider 104 may also utilize knowledge of Wi-Fi hotspot locations within a venue to determine the mobile device's position within the venue. Embodiments of the present disclosure may use any combination of location providers, outdoor or indoor, and those providers may use any suitable technology to facilitate location-detection.

Location-sensing program 110 is a computer program that is operable to estimate the position of a mobile device or to modify the execution of one or more computer programs based on the estimated position of the mobile device. In some embodiments, one or more portions of location-sensing program 110 run on a mobile device (such as, for example, computer system 401 of FIG. 4). Location-sensing program 110 is shown separately from such devices for convenience purposes only. One or more portions of location-sensing program 110 may be an application, service, operating system component, or any other type of computer program. In operation, location-sensing program 110 abstracts the position information provided by outdoor location providers 102 or indoor location providers 104 to obtain provider-independent position information. This normalized position information may be used to trigger one or more events on a user's mobile device. For example, based on the normalized position information, location-sensing program 110 may determine that the mobile device is approaching or entering a particular region and then trigger computer processing events that are associated with that region. As a particular example, a mobile device that is displaying a map associated with a first region may transition to displaying a different map associated with a different region when the device approaches or enters that region. As another example, entering a venue may cause location-sensing program 110 to change its utilization of different location providers. For example, entering a venue may cause location-sensing program 110 to utilize an indoor location provider 104 associated with that venue (or weight information provided by the associated indoor location provider 104 more heavily). In the illustrated embodiment, location-sensing program 110 includes normalization layer 120 and database 130.

Normalization layer 120 represents a portion of location-sensing program 110 that manages the abstraction of position information from different providers to obtain normalized position information. As discussed above, such providers may use different types of technologies and may provide position information that incorporates different types of information or different formats. By abstracting this information to one or more common data models, normalization layer 120 may provide a more streamlined, extensible, and efficient framework for processing position information. In the illustrated embodiment, normalization layer 120 includes or has access to outdoor position information 122, indoor position information 124, zone information 126, and metadata 128.

Outdoor position information 122 may include position information received from outdoor location providers 102 or normalized (or otherwise converted) position information. For example, in some embodiments, position information in a vendor-specific data model is received from a particular outdoor location provider 102 and is then converted into normalized data format. Normalizing position information in this manner may provide an abstraction for position information that facilitates comparison or combination with other normalized position information and allows other components of location-sensing program 110 or other programs to process a more uniform data model (rather than having to deal with a multitude of vendor-specific data models used by different location providers). The normalized data model (or data model) may include some, all, or none of the following types of information: latitude, longitude, altitude, bearing, speed, time, horizontal accuracy (e.g. accuracy on an X-axis as computed by sensors on the device, such as BLE or GPS, that are computed locally via sensors such as GPS, accelerometers or magnetic sensors on the mobile device), vertical accuracy (e.g. accuracy on a Y-axis and computed by sensors such as BLE, GPS, magnetic sensors, or barometric sensors), uncertainty radius (e.g. a level of confidence as calculated by the location provider based on factors such as signal strength), distance from a point of interest ("POI"), bearing from a POI, sensor information (e.g., information provided by one or more sensors of the mobile device or another device), and location status. Examples of location status include, but are not limited to, "confirmed" status, "unconfirmed" status, and information regarding confirmed or unconfirmed radio disturbances. In particular, radio disturbances may impact signal quality. In some examples, signal quality may be affected by line of sight (or lack thereof) and multi-path issues with GPS. Additionally, radio signal interference issues may occur with BLE due to similar radio frequencies, microwave ovens, or nearby power sources, Further, the lower layers of software on a device at the location provider sensor software at the operating system may provide the logic to deal with such disturbances, such as by providing the application a status reflecting whether the data is good. The status may be provided using the location provider.

Indoor location information 124 may include position information received from indoor location providers 104 or normalized (or otherwise converted) position information. Indoor position information 124 may be converted from a vendor-specific data model to a normalized data model analogous to the conversion of outdoor position information 122 discussed above. The normalized indoor data may have the same normalized data model as the outdoor data, or it may have a different normalized data model. Such "formats" may encompass the structure (e.g., its representation as a data structure) or the content (e.g. data types) of the data. Indoor position information 124 may include some, all, or none of the data types discussed above with respect to outdoor position information 122. Indoor position information 124 may also include one or more additional data types. For example, in a particular embodiment, the normalized data model for indoor position information 124 includes latitude, longitude, floor number, uncertainty radius, and location status, though other embodiments may utilize some, all, or none of these data types.

In some embodiments, normalization layer 120 normalizes information from outdoor and indoor location providers into a single data model rather than using separate data models for outdoor and indoor position information, though this is not required. Such data models may include any data type discussed above with respect to outdoor position information 122 and indoor position information 124 or any suitable data type. Normalization between outdoor and indoor location providers may provide a streamlined transition between regions (e.g., providing a seamless transition between indoor and outdoor location-detection and mapping) or otherwise simplify and improve the processing and utilization of position information from disparate providers.

In some embodiments, position information from multiple providers may be combined in any suitable manner. For example, one or more portions of outdoor position information 122 or indoor position information 124 may be combined using averages, weighted averages, or any other suitable method of generating combined data based on two or more data points. Some embodiments, may prioritize certain location providers based on accuracy levels, confidence intervals, configuration information indicating a preferred location provider for a particular region, or any other suitable factor. Location-sensing program 110 may utilize a hierarchy of location providers to determine which location provider should be used as an active location provider (in which case, position determinations may be based on the active location provider alone) or to determine how much weight to give each location provider when combining position information. Some embodiments may utilize assigned location provider priorities, and such priorities static or dynamic. For example, priorities may pre-configured, pre-configured based on position, or dynamically determined based on any suitable information (such as, for example, signal strength). Priorities or "active" providers may be determined by configuration information, signal strengths, sensor information, statistical methods, confidences levels, any other suitable method, or any suitable combination thereof.

Zone information 126 includes any suitable information related to one or more zones. Zone information 126 can include information about the location, size, or shape of a zone, information about one or more venues or regions associated with the zone, relationship information about one or more related zones, or any other suitable information. For example, zone information 126 may include information about one or more indoor location providers 104 operating in a venue within the zone. Such information may allow the mobile device to anticipate, select, prioritize, or otherwise manage position detection while within the zone. Zones may be outdoor, indoor, or both. In some embodiments, zone information 126 includes Geo-fence data. In operation, zone information 126 may provide a mechanism for triggering a transition between outdoor and indoor mapping (or vice versa), or it may provide an independent confirmation of a separate determination about entering or exiting a region that was made based on other information. In embodiments using the latter approach, zone information 126 and information from outdoor or indoor location providers may be used to perform a multi-factor validation for transitions between regions. Additional factors may also be used to validate such transitions. Furthermore, in some embodiments, zone information 126 is normalized as discussed above with respect to outdoor position information 122 and indoor position information 124 and may use the same data models discussed above or a different normalized data model.

Metadata 128 may include any type of information that is related to location providers, zones, points of interest, or other types of information discussed herein. For example, metadata 128 may include tags or categories associated with such items. Examples of metadata may include tags that are associated with specific location provider data, or data that is associated with a specific Geo-fence. Metadata can also be used for data analytics such as understanding the effectiveness of the Geo-fence or for understanding user engagement. Additionally, metadata may include a set of distinct name-value pairs that can be used to specify content and/or actions related to the location information, including an indication(s) of when a proximity or Geo-fence is breached.

Location database 130 is operable to store information used by location-sensing program 110. Such information includes, but is not limited to, configuration data 132, points of interest 134, zone data 136, and route data 138. For example, configuration data 132 may provide one or more settings or other information used to configure location-sensing program 110. Examples of configuration data may include latitude/longitude of a Geo-fence, radius of a Geo-fence, and related data or content. Configuration data may also include proximity IDs and/or related actions, such as logging an analytic event or displaying a notification. Points of interest 134 include information about one or more venues or other locations such as, for example, stores, restaurants, streets, buildings, or any other types of location. Zone data 136 may include any type of information discussed above with respect to zone information 126. Further, a zone may indicate a geographic area. For example, Geo-fences may be indicated by latitude/longitude and radius, but in addition to this, to make this more granular, there may be an associated venue (ID) and/or an associated floor (ID), in addition or alternatively to a proximity a proximity sensor (ID) and associated radius. Additionally, a time-period for which it is valid may be established. Route data 138 may include any suitable type of information about routes or navigation such as, for example, street data, traffic data, timing data, mapping data, or associated logic. Location database 130 may be stored locally on the mobile device, or one or more portions may be stored remotely (e.g., on a cloud server). In some embodiments, one or more portions of the information in location database 130 is synchronized with a remote server, such as location server 150. Such synchronization may be determined by the mobile device's current position (e.g., updating points of interest, zones, or routes that are close to the device's position), which may conserve device storage and bandwidth, though this is not required. Location database 130 may have any structure, configuration, or function described below with respect to electronic storage unit 415.

Figure 2:
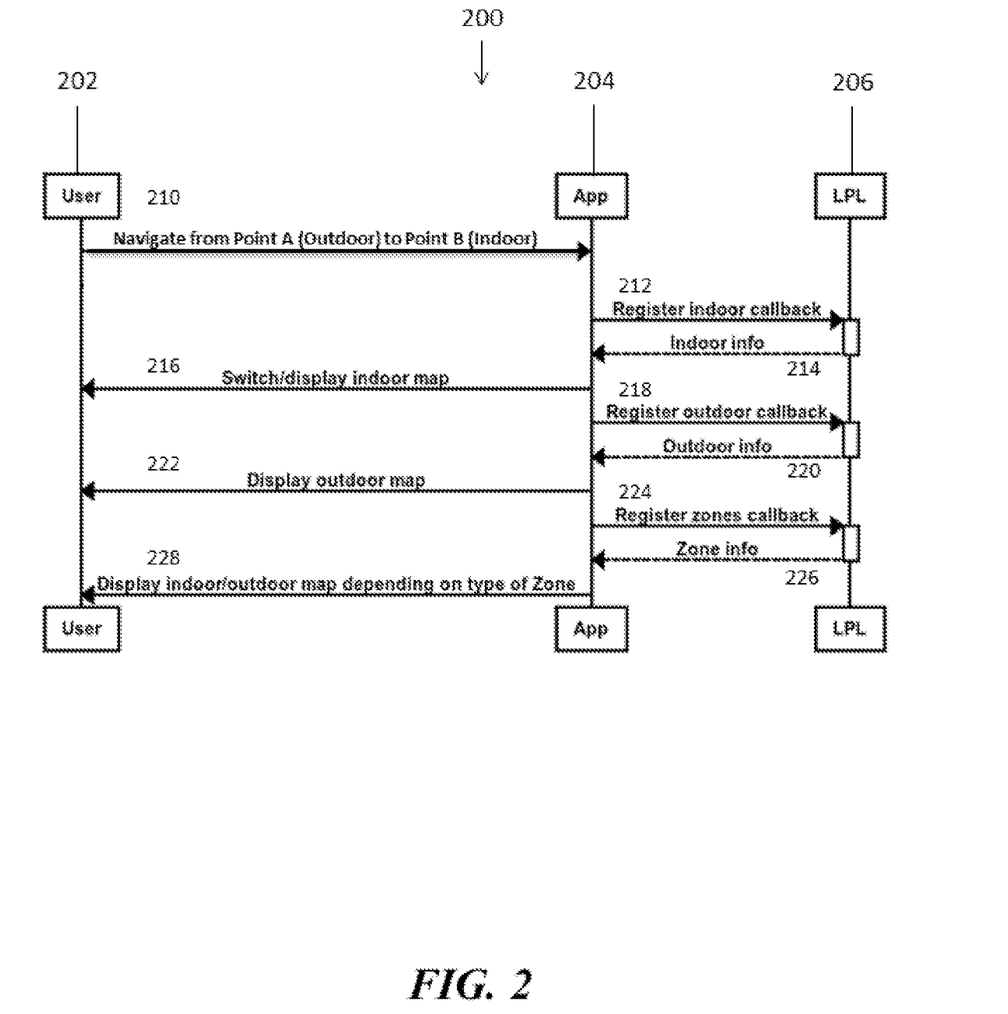
FIG. 2 illustrates an example sequence diagram that may be used in some embodiments of the present disclosure.

FIG. 2 illustrates an example sequence diagram that may be used in some embodiments of the present disclosure. Sequence diagram 200 describes events performed by or impacting user 202, application 204, and location provider layer 206. User 202 represents the user of a mobile device running application 204. In some examples, location provider layer 206 is a location provider normalization layer. A location provider normalization layer may work as a core of the normalization network. The illustrated operations are shown in a particular order to provide examples of location-based processing in certain embodiments of the present disclosure. However, other embodiments may perform certain of these operations in different orders, or they may perform one or more different operations. Some embodiments may perform some, all, or none of these operations. For example, some embodiments may use mechanisms other than callbacks to facilitate communication between the location-sensing framework and the applications that utilize the framework. Furthermore, while sequence diagram relates to the processing of a mapping application, other embodiments may be used in conjunction with any suitable type of application. For example, the device's position may be used to trigger advertisements or offers associated with a nearby venue to be presented on the device, may be communicated to other computer systems to facilitate location-based processing, or may trigger one or more other events in any location-aware application associated with the device.

At operation 210, the user moves from an outdoor location to an indoor location. Prior to processing this transition, application 204 is displaying an outdoor map. As shown in operation 212, application 204 registers an indoor callback with location provider layer 206. This callback is received at operation 214, at which time the application receives information related to the device's position such as, for example, information about the venue or other indoor location at which user 202 has arrived. Such callbacks may be received in real-time. Callbacks may be used to receive real-time notifications or triggers that the device has entered or is near a particular region. Callbacks may also be used to provide information related to the device's current location such as, for example, points of interest, map data, position information, or any other suitable type of information. In particular, callbacks may include asynchronous method calls from the LPL to the application. The information sent through a callback may be normalized information, such as latitude/longitude information, as described in the data model for indoor regions vs outdoor regions.

After receiving the indoor callback, application 204 switches to or otherwise displays the indoor map, as shown in operation 216. As shown in operation 218, application 204 registers from an outdoor callback with location provider layer 206, analogous to the indoor callback registration of operation 212. When the user navigates to another point outside the indoor region arrived at in operation 210, the application receives an outdoor callback, as shown in operation 220. Outdoor information received during this operation is analogous to the indoor information received during operation 214. After receiving the outdoor callback, application 204 switches its display to the outdoor map, as shown in operation 222.

Operations 224-228 illustrate the processing of zone callbacks. Zone callbacks may provide zone information, such as when a zone is entered or exited. This information may include an available venue ID, a floor ID, a proximity ID, and/or a degree of zone certainty, a zone status, and a time of entering/exiting a particular zone. At operations 224 and 226, respectively, the user registers for zone callbacks and then receives a callback with zone information after entering or exiting a particular zone. This process is analogous to the outdoor and indoor callback registration process discussed above. After receiving the zone callback, the application displays the map associated with the zone transition, as shown in operation 228. For example, if the user has entered a zone that is associated with a particular store that is located in an indoor region, application 204 may display an indoor map associated with that store. Similarly, if the user has entered a zone that is associated with a particular store that is located in an outdoor region, application 204 may display an outdoor map associated with that store.

Figure 3:
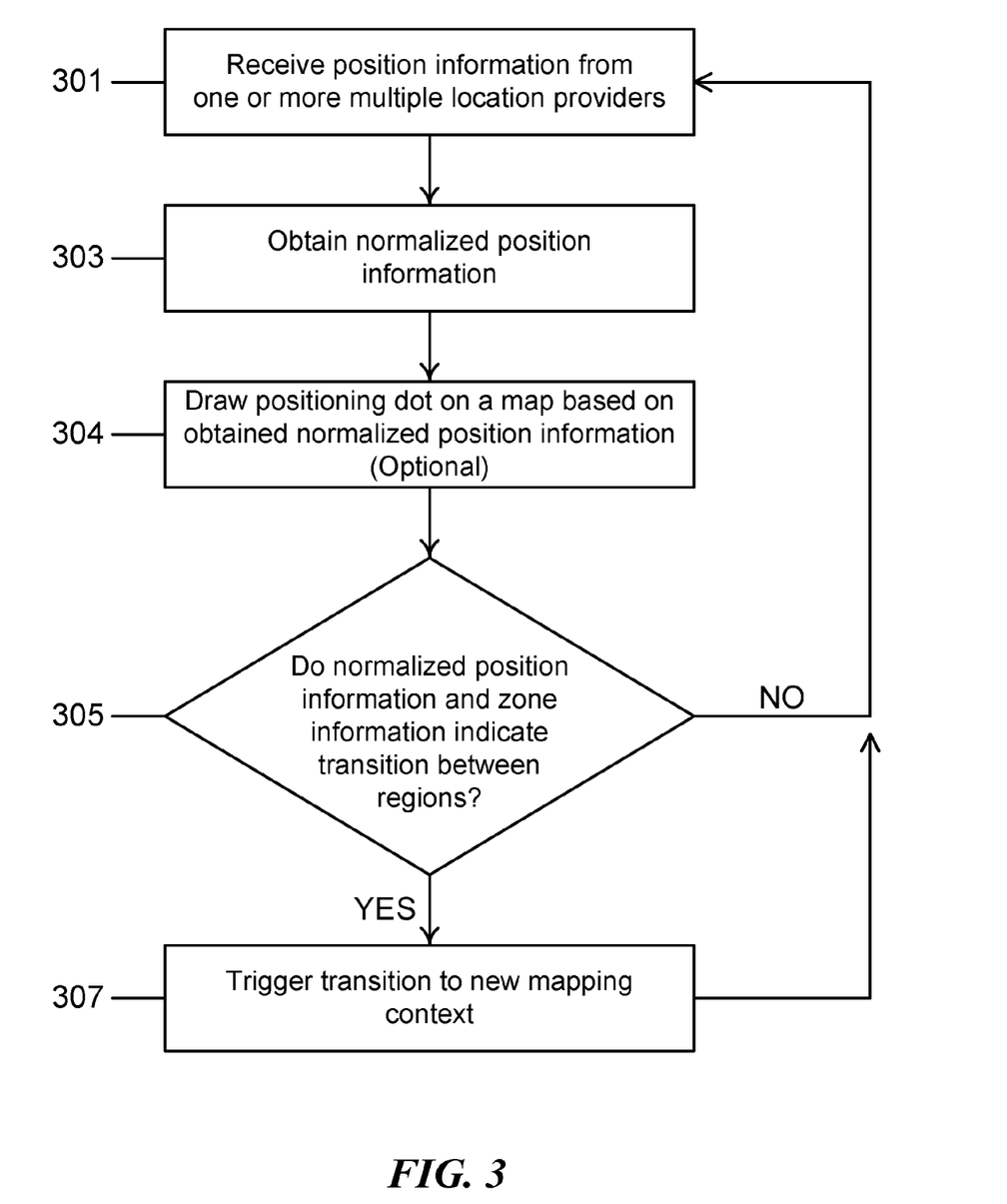
FIG. 3 illustrates an example flow chart that may be used in some embodiments of the present disclosure.

FIG. 3 illustrates an example flow chart that may be used in some embodiments of the present disclosure. This flow chart is provide as an example of the operation of certain embodiments, and other embodiments may perform some, all, or none of these operations. Some embodiments also perform additional operations.

At operation 301, the user's mobile device receives position information from multiple location providers. The received information may include any of the types of information discussed above with respect to outdoor position information 122 and indoor position information 124. For example, information from different types of outdoor and indoor location providers may be received, and the data models of this position information may be different from one another. In some examples, information may be received from indoor location providers, may be received from outdoor location providers, or may be received from indoor and outdoor location providers.

At operation 303, the device normalizes the position information received in operation 301. In some embodiments, the position information is converted into a normalized data model to generate a provider-independent abstraction of the device's position. Normalized position data from multiple providers may also be combined in any suitable manner to generate a "fused" position. In some embodiments, position data from both outdoor and indoor location providers may be combined into a single position estimate, though other embodiments may use separate indoor and outdoor position information. Additionally, the normalized position data may be used to draw a positioning dot on a map, as described in operation 304. As seen in FIG. 3, the drawing of a positioning dot on a map as described in operation 304 may be optional.

Some embodiments of normalizing the position information may prioritize one or more location providers. For example, location providers may be statically or dynamically arranged into a hierarchy or otherwise prioritized. Such priorities may be used to select an "active" location provider whose position information is used over the position information from other providers. Such priorities may also be used to weight one or more portions of the position information when generating a fused position. For example, a stronger signal from a particular location provider may result in more weight being given to that provider's data. Zone information may also be factored into the normalized position information, or zone information may be used as a separate validating factor when analyzing a transition between regions.

At operation 305, a determination is made as to whether the normalized position information and the zone information indicate that the mobile device is transitioning from one region to another. As discussed above, some embodiments utilize a multi-factor validation to assess such transitions. For example, normalized position information from multiple location providers may provide one factor and zone information may provide a second factor, though other factors may also be considered. Such factors may be weighted equally, or certain factors may be given more weight than others. In some embodiments, each factor may be treated as necessary predicate for making an affirmative determination of region-transition and triggering related events, though this is not required. If a transition between regions is not indicated, location sensing may continue as before. If a transition is indicated, the process may continue to operation 307.

At operation 307, location-sensing program 110 triggers a transition to a new mapping context in one or more programs executing on the mobile device. For example, determining that the device has entered a particular region in operation 305 may cause a mapping application to display one or more portions of a map associated with that particular region. Such transitions may occur automatically such that the user experience is seamless while moving inside and outside. While this particular flow chart illustrates a mapping example, other embodiments may trigger different types of events. For example, the determination of operation 305 may trigger a change in the "active" location provider (e.g., shifting to an indoor location provider after moving into a particular venue) or a change in location provider prioritization. Other types of applications may be affected as well. For example, location transitions may trigger events in shopping applications, gaming applications, or any other location-aware application.

Various embodiments may perform some, all, or none of the operations described above. For example, as discussed above, some embodiments may omit operation 307 and may trigger other types of location-aware processing. Some or all of the operations shown in FIG. 3 may be performed by location-sensing program 110 of FIG. 1 or another application running on the user's mobile device. For convenience purposes only, the discussion below describes the functions being performed by the user's mobile device, though some or all of these operations may be performed by a device that is separate from the user's mobile device in some embodiments. Furthermore, while shown in a particular order, certain operations may be performed in different orders or may be performed simultaneously with other operations. For example, position information may be received or normalized continuously (or periodically) while other operations are being performed. Some embodiments may perform additional operations not shown in FIG. 3. For example, some embodiments may encrypt or decrypt information before storage or communication using any suitable form of encryption.

Figure 4:
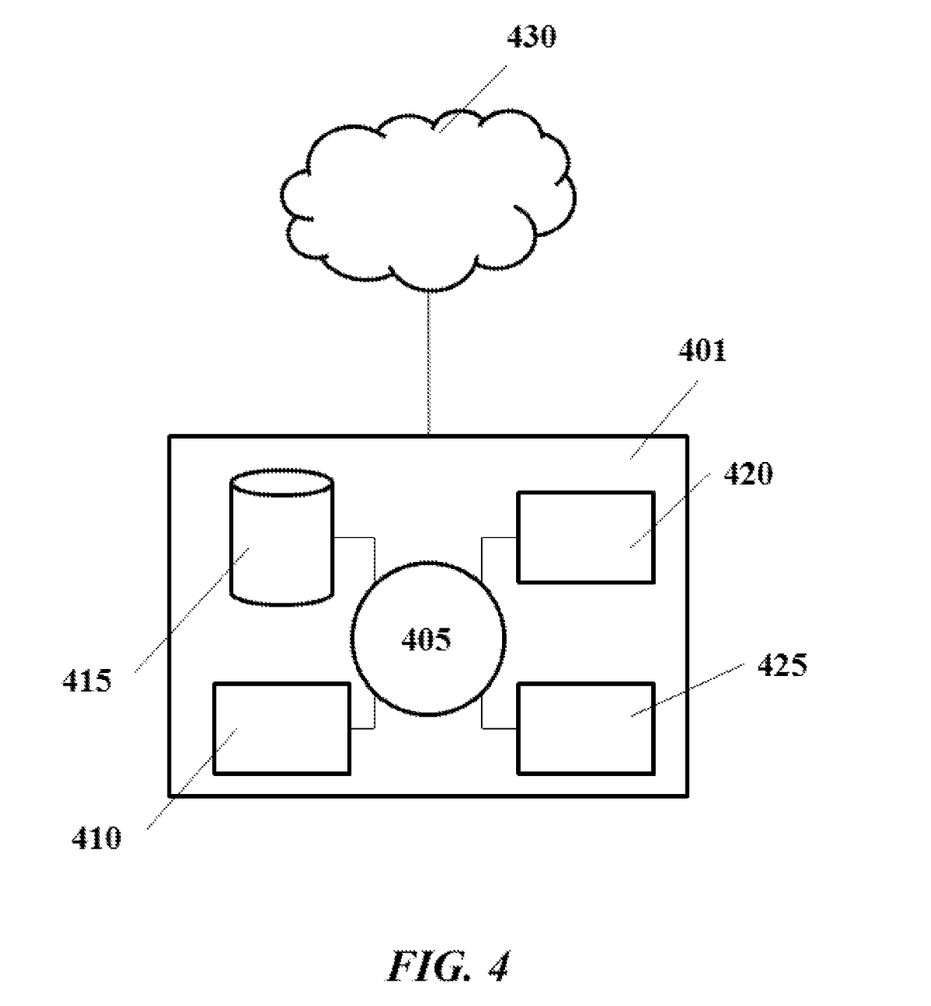
FIG. 4 shows a computer control system that is programmed or otherwise configured to implement methods provided herein.

The present disclosure provides computer control systems that are programmed to implement methods of the disclosure. FIG. 4 shows a computer system 401 that is programmed or otherwise configured to detect and manage responses to mobile device position changes. The computer system 401 can regulate various aspects of FIGS. 1-3 of the present disclosure, such as, for example, location-sensing program 110, one or more operations of sequence diagram 200, or one or more operations of the flow chart illustrated in FIG. 3.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410. Furthermore, some or all of the data discussed above with respect to FIGS. 1-3 may be stored on memory 410 or electronic storage unit 415, and such information can be stored in any suitable format. For example, such information may be stored in files, databases, tree structures, or any suitable data structure.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display that comprises a user interface (UI) for providing, for example, display of one or more portions of a map. As a particular example, computer system 401 may determine that the mobile device is moving from a first region associated with a first map to a second region associated with a second map and, based on that determination, cause an application to display at least a portion of the second map. Examples of UI's include, without limitation, a graphical user interface (GUI) and web-based user interface.

Methods and systems of the present disclosure can be implemented by way of one or more algorithms. An algorithm can be implemented by way of software upon execution by one or more computer processors. For example, some embodiments use the algorithm illustrated in FIG. 2 or other algorithms provided in the associated description. Other embodiments may use algorithms similar to those of FIG. 3 and its associated description.

As used herein, "or" is inclusive and not exclusive, unless expressly indicated otherwise or indicated otherwise by context. Therefore, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

While preferred embodiments of the present disclosure have been shown and described herein, it will be obvious to those skilled in the art that such embodiments are provided by way of example only. The descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. This disclosure encompasses all changes, substitutions, variations, alterations, and modifications to the example embodiments herein that a person having ordinary skill in the art would comprehend. It is intended that the following claims define the scope of the invention and that methods and structures within the scope of these claims and their equivalents be covered thereby.

What is claimed is:

1. A computer-implemented method for performing location-based computer processing by a mobile device, comprising:
   receiving first position information from a first location provider, the first position information having a first data model, wherein the first position information indicates a position of the mobile device;
   receiving second position information from a second location provider, the second position information having a second data model, wherein the second position information indicates a position of the mobile device, wherein the first data model is different than the second data model;
   obtaining first normalized position information based at least in part on the first position information and second position information, the first normalized position information having a normalized data model;
   determining with a computer processor that the mobile device is transitioning from a first geographic region associated with first map data to a second geographic region associated with second map data based at least on the first normalized position information;
   determining that the mobile device has entered a zone associated with the second geographic region based on the first normalized position information and based on information related to a boundary of a Geo-fence that is associated with the second region; and
   based at least in part on the determination that the mobile device is transitioning from the first geographic region to the second geographic region, displaying a map of the second geographic region on a user interface of the mobile device.

2. The method of claim 1, wherein the first geographic region is an outdoor region and the second geographic region is an indoor region.

3. The method of claim 2, wherein a second geographic region call back is used to determine that the mobile device has entered the zone associated with the second geographic region.

4. The method of claim 1, further comprising:
   receiving indoor position information from an indoor location provider associated with the second geographic region, the indoor position information estimating a position of the mobile device within the second geographic region;
   obtaining second normalized position information based at least on the indoor position information;
   determining, based at least in part on the second normalized position information, that the mobile device is transitioning from the second geographic region to the first geographic region; and
   based at least in part on the determination that the mobile device is transitioning from the second geographic region to the first geographic region, displaying a map of the first geographic region on the user interface of the mobile device.

5. The method of claim 1, wherein obtaining the first normalized position information comprises:
   generating first converted data by converting the first position information to the normalized data model;
   generating second converted data by converting the second position information to the normalized data model;
   generating the first normalized position information by combining at least a portion of the first converted data and at least a portion of the second converted data.

6. The method of claim 1, wherein obtaining the normalized position information comprises:
   selecting one of the first and second information providers as an active information provider; and
   converting the respective position information of the active information provider into the first normalized position information.

7. The method of claim 6, wherein the activation provider is selected based on configuration data.

8. The method of claim 7, wherein the configuration data includes at least one of Geo-fence data, proximity data, indoor region information, and outdoor region information.

9. The method of claim 6, wherein the selecting is based on one or more of the following factors:
   a signal strength associated with the first or second location provider;
   sensor information provided by the mobile device; and
   a confidence level associated with the first or second location provider.

10. The method of claim 9, wherein the confidence level is calculated by the operating system based on the sensor information.

11. The method of claim 1, wherein the normalized data model comprises one or more of the following data types: latitude; longitude; altitude; bearing; speed; time; floor number; horizontal accuracy; vertical accuracy; uncertainty radius; and location status.

12. The method of claim 1, wherein the first location provider or the second location provider estimates the geographic position of the mobile device using one or more of the following systems:
   Global Positioning System;
   Global Navigation Satellite System;
   Bluetooth;
   Bluetooth Low Energy;
   Wi-Fi;
   Near-Field Communication; and
   ZigBee.

13. A computer-implemented method for performing location-based computer processing by a mobile device, comprising:
   receiving first position information from an outdoor location provider, wherein the first position information indicates a position of the mobile device;
   receiving second position information from an indoor location provider, wherein the second position information indicates a position of the mobile device, and wherein the indoor location provider is distinct from the outdoor location provider;
   obtaining normalized position information based at least in part on the first position information and second position information;
   determining with a computer processor that the mobile device is transitioning from a first geographic region associated with first map data to a second geographic region associated with second map data based at least on the normalized position information;
   determining that the mobile device has entered a zone associated with the second geographic region based on the normalized position information and based on information related to a boundary of a Geo-fence that is associated with the second region; and
   based at least in part on the determination that the mobile device is transitioning from the first geographic region to the second geographic region, displaying a map of the second geographic region on a user interface of the mobile device.

14. The computer-implemented method of claim 13, wherein the normalized position information has a normalized data model.

15. The computer-implemented method of claim 14, wherein the normalized data model is independent of a location of the mobile device as being in an indoor region or an outdoor region.

16. The computer-implemented method of claim 13, wherein the normalized position information is provider-independent.

17. The computer-implemented method of claim 13, wherein the first and second position information is readily combined.

18. The computer-implemented method of claim 13, wherein at least one of the first and second position information includes information that is indicative of a future position of the mobile device.

19. The computer-implemented method of claim 18, wherein the at least one of the first and second position information includes information that is indicative of a heading or a speed of the mobile device.

20. The computer-implemented method of claim 18, wherein the at least one of the first and second position information includes information that is indicative of an estimated path of the mobile device.

* * * * *